(12) United States Patent
Kyouzuka et al.

(10) Patent No.: US 7,136,050 B2
(45) Date of Patent: Nov. 14, 2006

(54) INFORMATION PROCESSING APPARATUS HAVING BATTERY AND PENHOLDER

(75) Inventors: Masahiko Kyouzuka, Kawasaki (JP); Katsunori Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 362 days.

(21) Appl. No.: 10/458,526

(22) Filed: Jun. 10, 2003

(65) Prior Publication Data
US 2003/0227443 A1 Dec. 11, 2003

(30) Foreign Application Priority Data
Jun. 11, 2002 (JP) ............................ 2002-170533

(51) Int. Cl.
*G09G 5/00* (2006.01)

(52) U.S. Cl. .................. 345/173; 345/168; 345/169; 345/174; 345/156

(58) Field of Classification Search ............... 345/173, 345/174, 169, 156, 168, 905; 178/18.01–18.03; 395/326; 361/681, 683, 384, 686; 384/100; 439/500
See application file for complete search history.

(56) References Cited

U.S. PATENT DOCUMENTS

| | | | | |
|---|---|---|---|---|
| 4,797,783 A * | 1/1989 | Kohmoto et al. | ............ | 361/695 |
| 5,653,459 A * | 8/1997 | Murphy | ....................... | 280/166 |
| 5,657,459 A * | 8/1997 | Yanagisawa et al. | ........ | 361/681 |
| 5,729,251 A * | 3/1998 | Nakashima | .................. | 709/250 |
| 5,867,148 A * | 2/1999 | Kamimaki et al. | .......... | 345/169 |
| 5,870,713 A * | 2/1999 | Haneda et al. | .................. | 705/9 |
| 5,959,615 A * | 9/1999 | Yamade et al. | ............. | 345/173 |
| 6,288,030 B1 * | 9/2001 | Hershenson | .................. | 514/12 |
| 6,301,101 B1 * | 10/2001 | Anzai et al. | ................. | 361/683 |
| 6,633,279 B1 * | 10/2003 | Kono et al. | ................... | 345/173 |
| 6,633,280 B1 * | 10/2003 | Matsumoto et al. | ......... | 345/173 |
| 6,862,019 B1 * | 3/2005 | Kobayashi et al. | .......... | 345/173 |
| 2001/0033276 A1 | 10/2001 | Santoh | | |
| 2003/0081395 A1 * | 5/2003 | Katagiri | ....................... | 361/800 |
| 2004/0233468 A1 * | 11/2004 | Ibaraki et al. | .............. | 358/1.13 |
| 2005/0007514 A1 * | 1/2005 | Faris et al. | .................... | 349/58 |
| 2005/0163404 A1 * | 7/2005 | Shishido et al. | ............. | 384/100 |

FOREIGN PATENT DOCUMENTS

| | | |
|---|---|---|
| JP | 10-039983 | 2/1998 |
| JP | 10-240420 | 9/1998 |
| JP | 10-260760 | 9/1998 |
| JP | 11-134064 | 5/1999 |
| JP | 11-184579 | 7/1999 |
| JP | 11-327775 | 11/1999 |
| JP | 2001-306177 | 11/2001 |

* cited by examiner

*Primary Examiner*—Bipin Shalwala
*Assistant Examiner*—Prabodh Dharia
(74) *Attorney, Agent, or Firm*—Greer, Burns & Crain, Ltd.

(57) ABSTRACT

An information processing apparatus having a rectangular body and which is used in any vertical or horizontal orientation includes a pair of short side portions and a pair of long side portions. A battery disposed at a short side portion of the body overlaps with the upper cover. A penholder is positioned at a long side portion of the body adjacent to the short side portion where the battery is positioned. The information processing apparatus also has an air outlet opening disposed at or near a corner portion of the body between the short side portion of the body opposed to the side portion where the battery is positioned and the long side portion of the body opposed to the long side portion where the pen is positioned. The information processing apparatus further includes a radio communication receiving element disposed at the long side portion where the penholder is positioned.

2 Claims, 19 Drawing Sheets

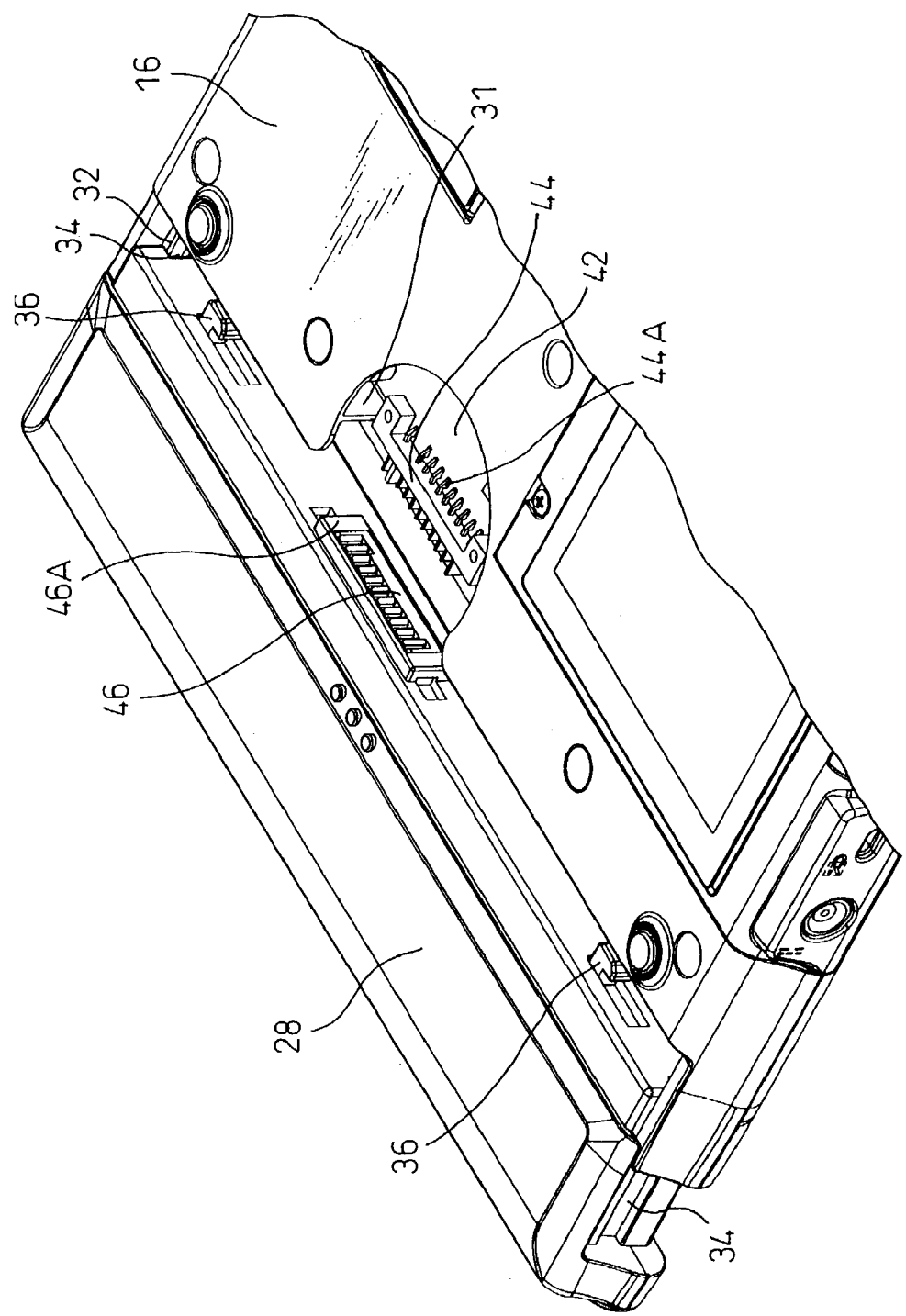

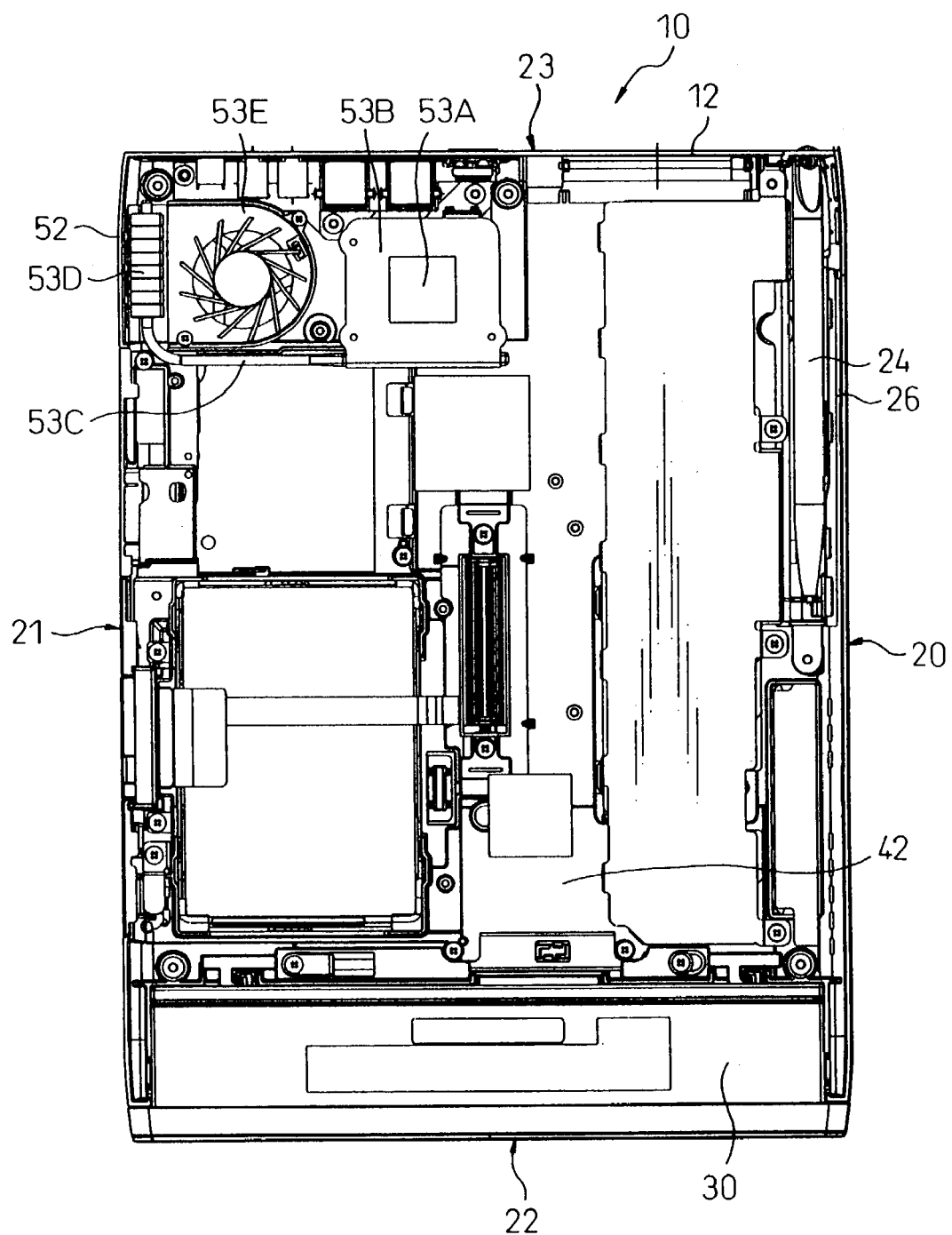

INFORMATION PROCESSING APPARATUS HAVING BATTERY AND PENHOLDER

BACKGROUND OF THE INVENTION

1. Field of the Invention

The present invention relates to an information processing apparatus.

2. Description of the Related Art

A tablet PC is a flat plate-like rectangular personal computer to which data can be input with a pen. The present invention provides a tablet PC usable in any one of a horizontal position and a vertical position. Conventionally, a tablet PC usable in any one of a horizontal position and a vertical position is not known.

A tablet PC is required to be as thin and light as possible because it is used while being held with a hand. When a tablet PC is used in a horizontal position while being held with a hand, it is convenient that long side portions of the tablet PC are kept horizontally and the lower long side portion is held with a hand. On the other hand, when a tablet PC is used in a vertical position while being held with a hand, it is convenient that short side portions of the tablet PC are kept horizontally and the lower short side portion is held with a hand.

In addition, a tablet PC has an air outlet opening for discharging heat generated in it. In a recent PC, a cooling fan is disposed in the PC to discharge heat generated in the PC to the outside through the air outlet opening. Furthermore, a tablet PC has a receiving means for radio communication by which data sent from a keyboard or a mouse by radio can be received. The air outlet opening and the radio receiving means are required to be disposed so as to function effectively when the tablet PC is used in any of the horizontal position and the vertical position.

SUMMARY OF THE INVENTION

It is therefore an object of the present invention to provide an information processing apparatus which can be used in any of a horizontal position and a vertical position, can be made into a lightweight structure, and has an air outlet opening and/or a radio communication receiving means.

An information processing apparatus according to the present invention comprises a rectangular body including a lower cover and an upper cover covering the lower cover, a battery disposed at a side portion of the body so as to at least partly overlap with the upper cover, a penholder disposed at a side portion of the body adjacent to the side portion at which the battery is disposed, an air outlet opening disposed at or near a corner portion of the body between a side portion of the body opposed to the side portion at which the battery is disposed and a side portion of the body opposed to the side portion at which the penholder is disposed, and a receiving means for radio communication disposed at the side portion at which the penholder is disposed.

In this configuration, a small and light tablet PC can be realized because a battery is disposed at one side portion of the body of it, and a tablet PC having a body strength sufficient to be held can be realized because the upper cover overlaps with the battery. The air outlet opening is always disposed at an upper position of the tablet PC when it is used in any of the horizontal position and the vertical position, and can thus discharge heated air to the outside of the tablet PC. Furthermore, the receiving means of radio communication can receive a radio communication signal when the tablet PC is used in any of the horizontal position and the vertical position.

BRIEF DESCRIPTION OF THE DRAWINGS

The present invention will become more apparent from the following description of the preferred embodiments, with reference to the accompanying drawings, in which:

FIG. 5 is a perspective bottom view of the tablet PC of FIG. 5, in the state in which the battery is being attached to the body;

FIG. 7 is a plan view showing the interior of the tablet PC;

DESCRIPTION OF THE PREFERRED EMBODIMENTS

Figure 1:
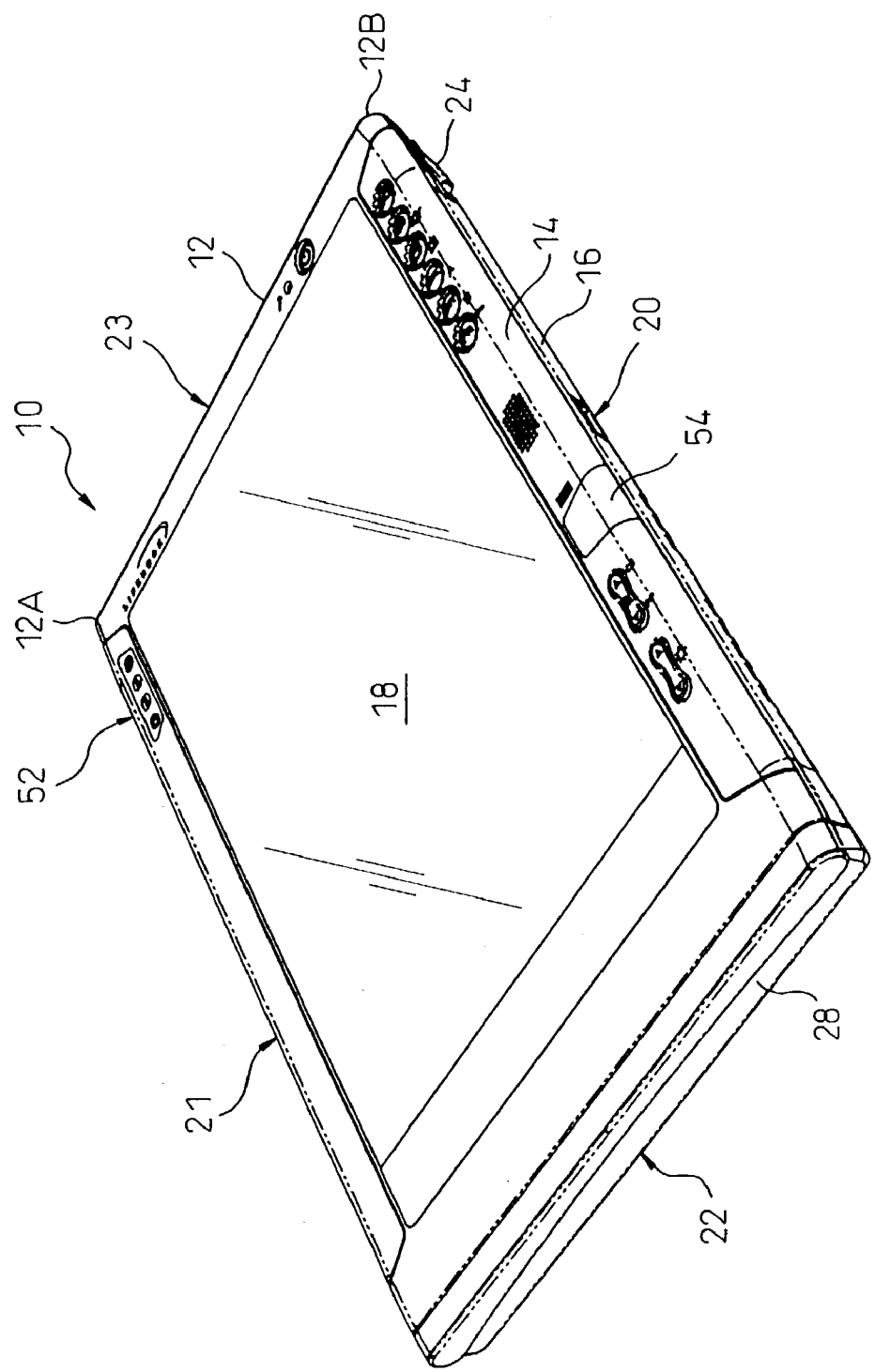
FIG. 1 is a perspective view of a tablet PC according to an embodiment of the present invention.
Figure 2:
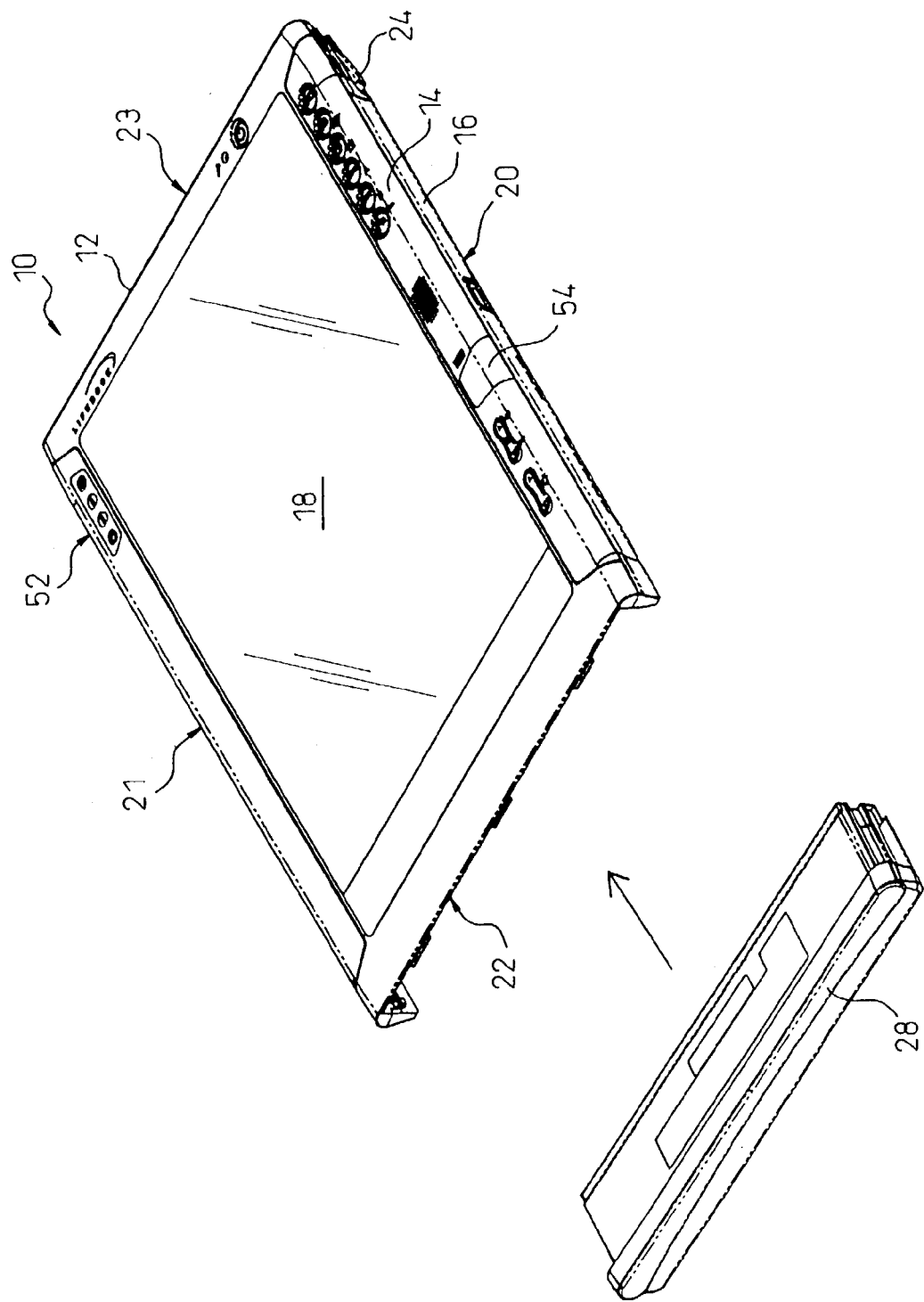
FIG. 2 is a perspective view of the tablet PC of FIG. 1, in the state in which the battery is removed from the body.
Figure 3:
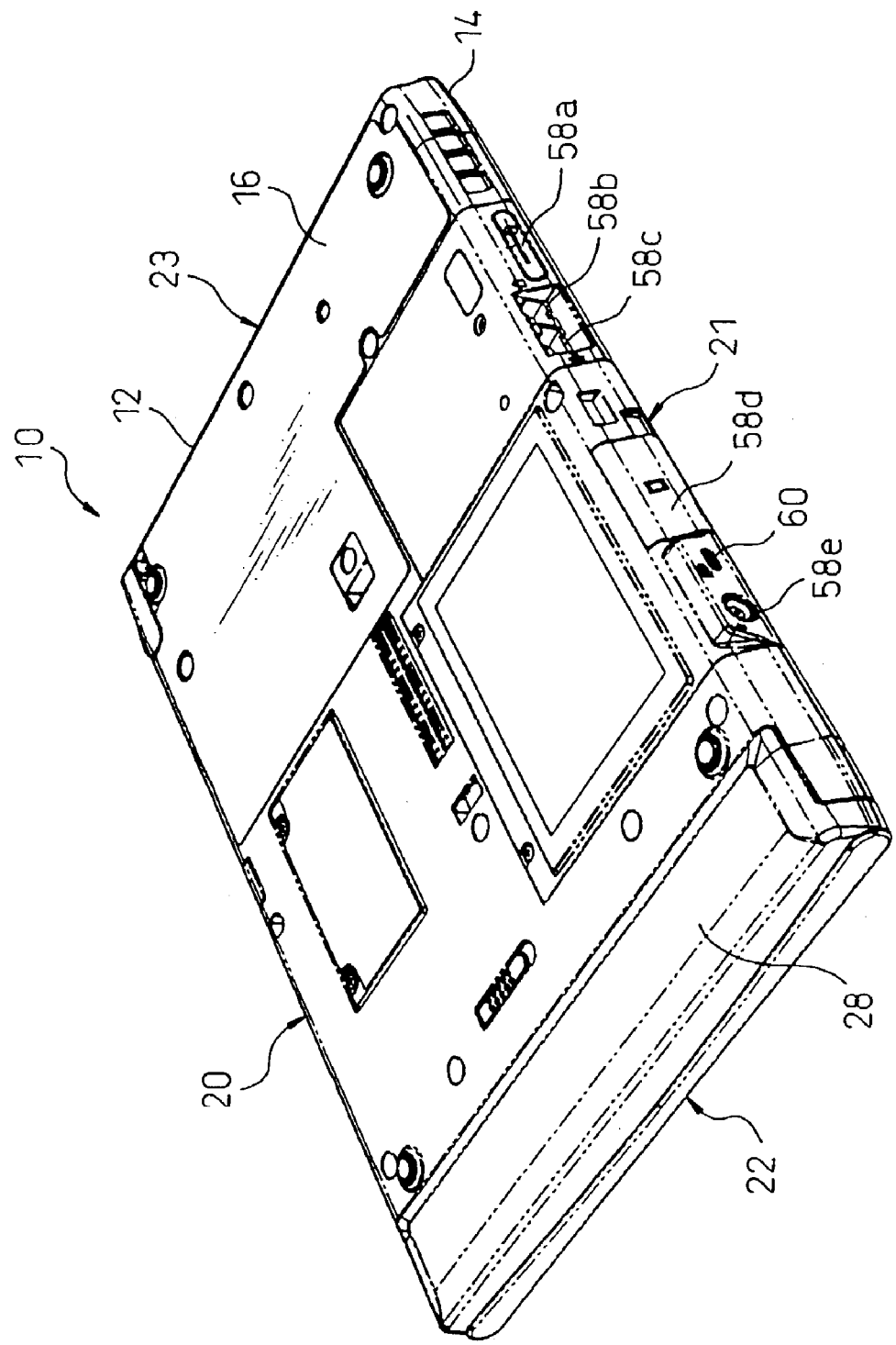
FIG. 3 is a perspective bottom view of the tablet PC of FIG. 1, seen from the bottom.
Figure 4:
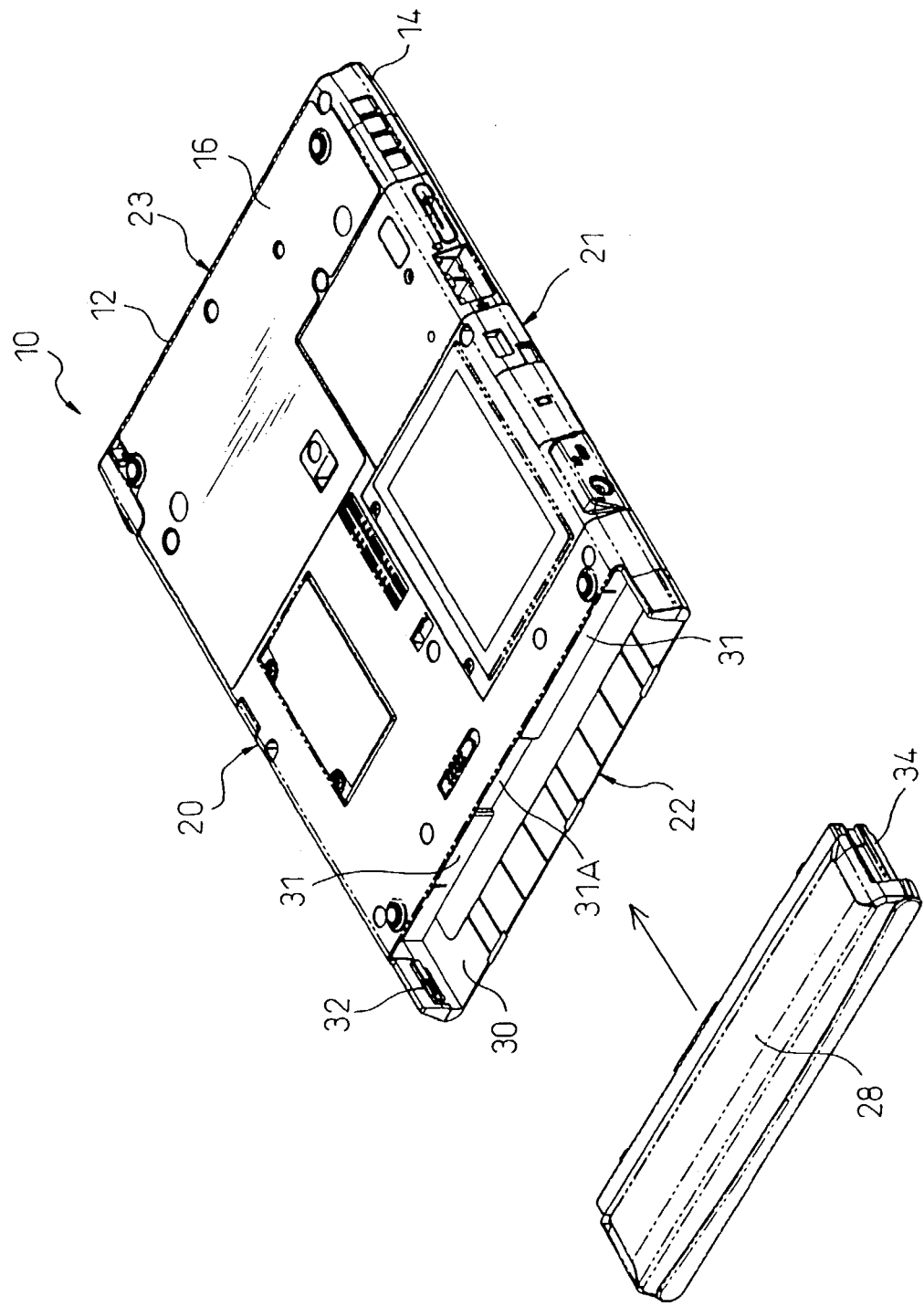
FIG. 4 is a perspective bottom view of the tablet PC of FIG. 3, in the state in which the battery is removed from the body.

The preferred embodiments of the present invention, in which an information processing apparatus is applied to a tablet PC, are described below with reference to the drawings. FIG. 1 is a perspective view of a tablet PC of an embodiment of the present invention, and FIG. 2 is a perspective view of the tablet PC of FIG. 1, in the state in which the battery is removed from the body. FIG. 3 is a perspective bottom view of the tablet PC of FIG. 1, seen from the bottom, and FIG. 4 is a perspective bottom view of the tablet PC of FIG. 3, in the state in which the battery is removed from the body.

The tablet PC 10 shown in FIGS. 1 to 4 has a flat plate-like rectangular body 12. The body 12 comprises a lower cover 16 and an upper cover 14 covering the lower cover 16. A display portion 18 is provided in the surface of the body 12. Electronic components (not shown in the drawings) and a printed circuit board are disposed in the body 12. The body 12 has a first long side portion 20 and a second long side portion 21 opposed to each other, and a first short side portion 22 and a second short side portion 23 opposed to each other.

The tablet PC 10 is a personal computer to which information can be input with a pen 24. FIG. 7 is a plan view showing the interior of the tablet PC. The pen 24 is accommodated in a penholder 26 provided along the first long side portion 20. The penholder 26 is a substantially cylindrically shaped container which opens toward the second short side portion 23, and extends downward from the upper end of the first long side portion 20 to the middle part of the first long side portion 20. The pen 24 is taken out from the penholder 26 when it is used. For example, the pen 24 has a coil and the body 12 has an antenna. Data can be input with the pen 24 through the interaction between the coil and the antenna. Data can be input to the tablet PC 10 by clicking the pen 24 toward the display portion 18 or allowing the pen 24 to make contact with the display portion 18.

A battery 28 is disposed at the first short side portion 22 of the body 12 so as to overlap with the upper cover 14. As shown in FIG. 4, a battery-accommodating portion 30 is provided at the first short portion 22 of the body 12, and the battery 28 is inserted in the battery-accommodating portion 30 of the first short portion 22 of the body 12 as shown by the arrow.

The battery-accommodating portion 30 has an end wall 31 having an opening 31A. The bottom wall of the lower cover 16 terminates at the end wall 31 of the battery-accommodating portion 30, and the upper cover 14 extends beyond the end wall 31 of the battery-accommodating portion 30. Thus, in the state that the battery 28 is attached to the body 12, the battery 28 overlaps with the upper cover 14 but is substantially exposed from the bottom wall of the lower cover 16. The width of the battery 28 is nearly equal to that of the body 12.

For example, supposing that the battery 28 is disposed in the body 12, the battery 28 may be arranged to overlap with electronic components in the body, and thereby the total thickness of the body increases and the weight of it increases accordingly. On the other hand, by arranging the battery 28 at the first short side portion 22 of the body 12, the battery 28 can be disposed on the extension line of electronic components in the body so that it does not overlap with the electronic components, and thereby the thickness of the body can be reduced to a value nearly equal to the thickness of the battery 28 and the weight of the body can be reduced accordingly. Also, by arranging the battery 28 to overlap with the upper cover 14, the strength of the portion around the battery 28 may be increased, compared with the case where the battery 28 is simply disposed at the side of the body 12.

FIG. 5 is a perspective bottom view of the tablet PC of FIG. 4, in the state in which the battery 28 is being attached to the body. In FIG. 5, part of the lower cover 16 is cut away to show a printed circuit board 42 in the body 12. As shown in FIGS. 4 and 5, the side walls of the battery-accommodating portion 30 of the body 12 have guides 32, and the sides of the battery 28 have guide slots 34. Thus, the battery 28 can be inserted in the battery-accommodating portion 30 by the sliding engagement of the guide slots 34 with the guides 32.

Figure 6A:
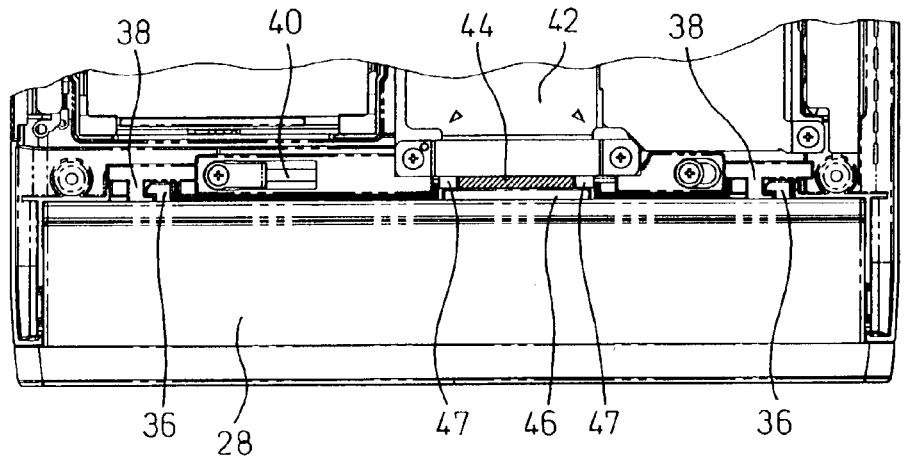
FIG. 6A is a bottom view of the tablet PC of FIG. 5, with the battery accommodated in the battery-accommodating portion.

The battery 28 has lock claws 36 at its front end, and the end wall 31 of the battery-accommodating portion 30 has lock claws 38 as shown in FIG. 6A. The lock claws 38 are biased by springs 40. When the battery 28 is inserted in the battery-accommodating portion 30, the lock claws 36 move behind the lock claws 38 while pushing the lock claws 38 transversely, and then the lock claws 38 are pushed back by the springs 40 to engage with the lock claws 36, and the battery 28 is thus locked in the body 12.

Figure 6B:
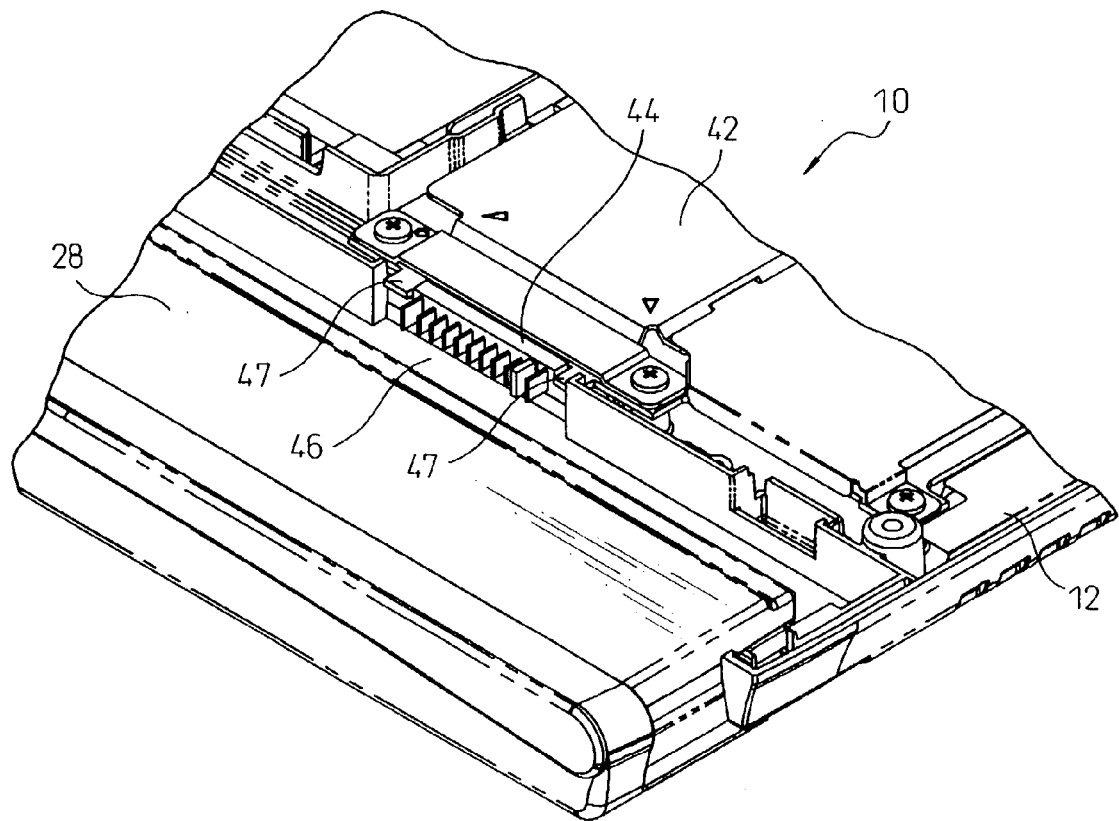
FIG. 6B is a perspective view of the tablet PC of FIG. 5 with the battery accommodated in the battery-accommodating portion.

FIG. 6A is a bottom view of the tablet PC of FIG. 5, in the state in which the battery 28 is accommodated in the battery-accommodating portion 30. FIG. 6B is a perspective view of the tablet PC of FIG. 6A. In FIGS. 6A and 6B, the lower cover 16 is removed from the tablet PC. As shown in FIGS. 5, 6A and 6B, the printed circuit board 42 is disposed in the body 12 to extend to the vicinity of the end wall 31 of the battery-accommodating portion 30. A first connector 44 is fixed to the printed circuit board 42. The first connector 44 is exposed to the battery-accommodating portion 30 from the opening 31A of the end wall 31.

The battery has a second connector 46 at its front end, and when the battery 28 is inserted into the battery-accommodating portion 30, the second connector 46 engages with the first connector 44. The first connector 44 has pin-type or hole-type contacts, a connector case surrounding the contacts and terminals 44a which are connected to the printed circuit board 42 by soldering. In FIGS. 6A and 6B, the lock claws 38 are engaged with the lock claws 36, and the second connector 46 is engaged with the first connector 44. The second connector 46 has pin-type or hole-type contacts and a connector case 46A surrounding the contacts. The reference numeral 47 denotes a stopper.

Figure 9:
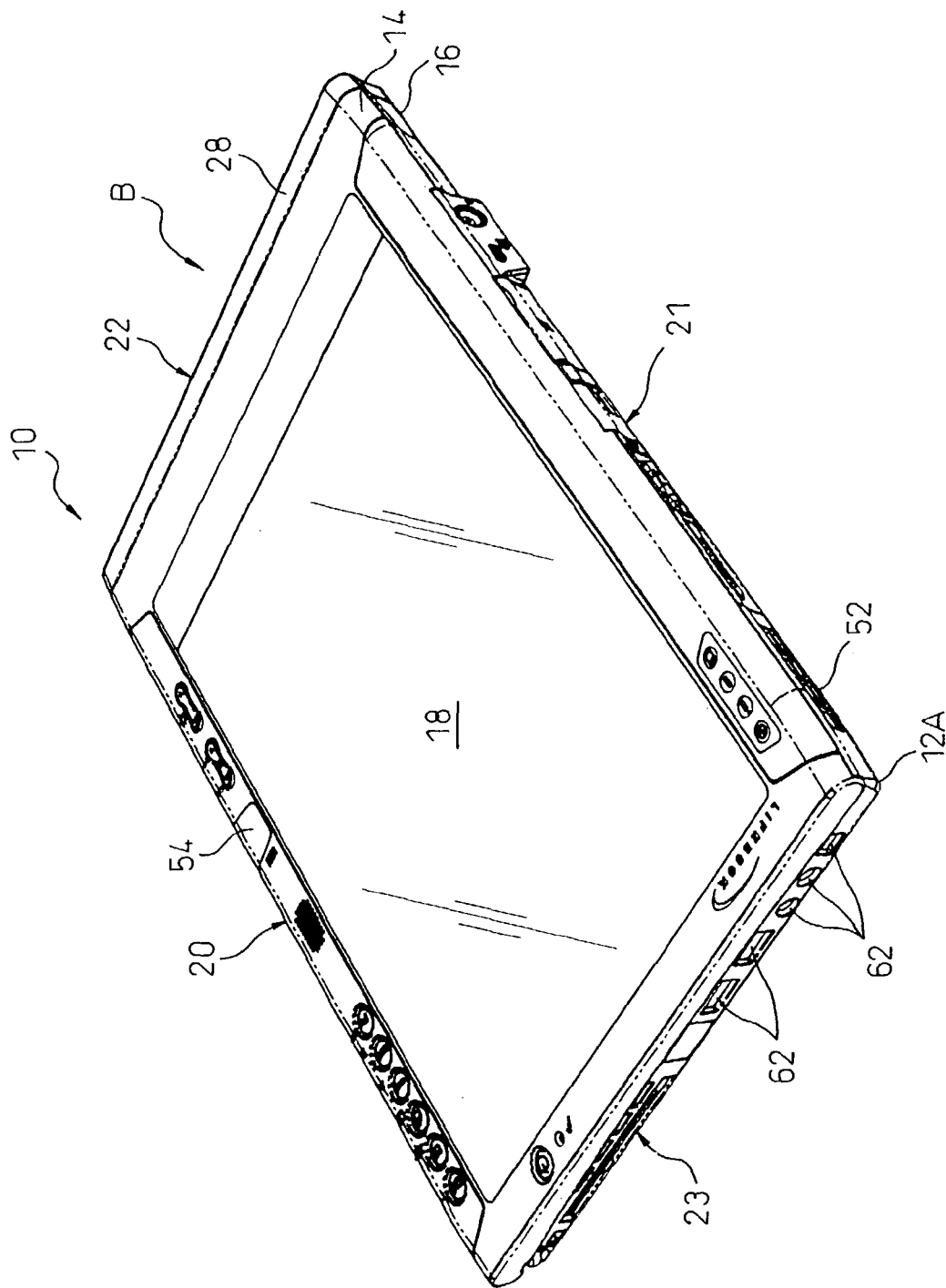
FIG. 9 is a perspective view of the tablet PC, seen from the corner portion between the second short side portion and the second long side portion of FIG. 1.

FIG. 9 is a perspective view of the tablet PC, seen from the corner portion 12A between the second short portion 23 and the second long side portion 21 of FIG. 1. An air outlet opening 52 is disposed at or near the corner portion 12A between the second short portion 23 and the second long side portion 21 of the body 12. That is, the air outlet opening 52 is disposed near the corner portion 12A between the second short side portion 23 opposed to the first short side portion 22 at which the battery 28 is disposed and the second long side portion 21 opposed to the first long side portion 20 at which the pen 24 is disposed. In this embodiment, the air outlet opening 52 is a lattice shaped opening disposed near the corner portion 12A.

Figure 8:
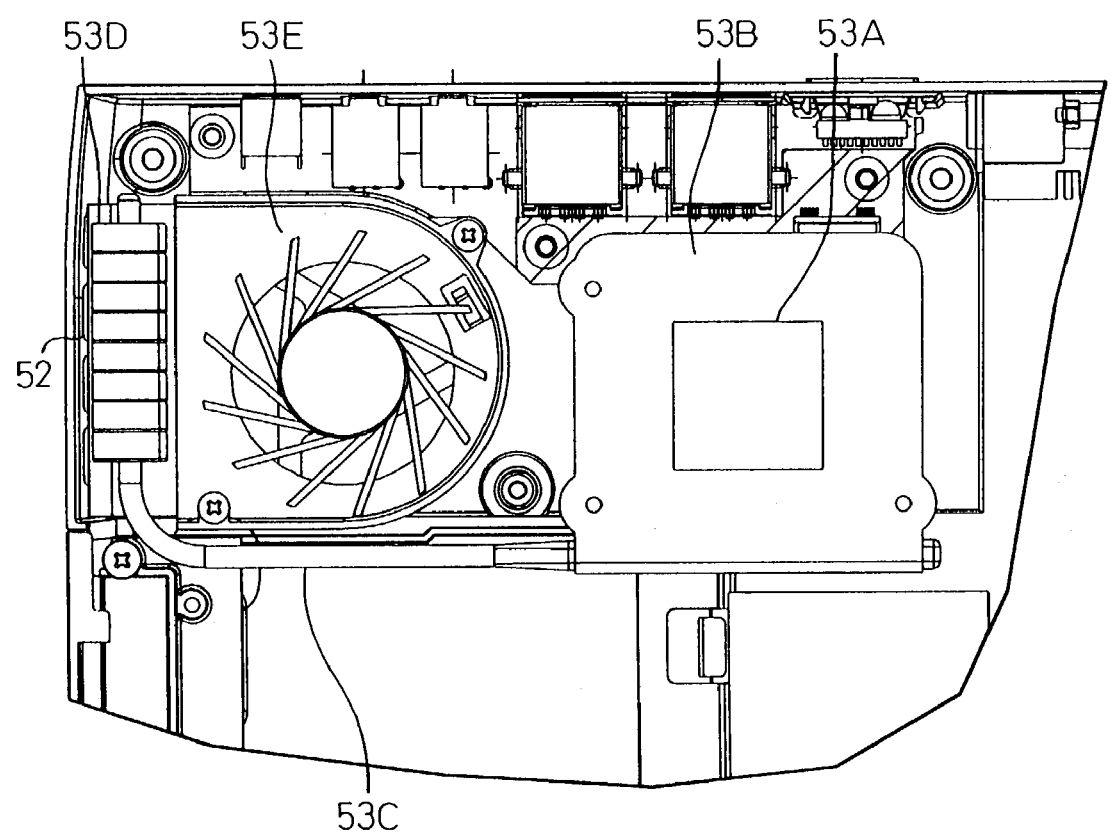
FIG. 8 is an enlarged plan view showing the interior of the tablet PC of FIG. 7.

FIGS. 7 and 8 show a heat sink and a fan disposed in the body. A CPU 53A is disposed in the body 12. The CPU 53A generates heat when it is used. A heat sink 53B is disposed in contact with the CPU 53A, and a heat pipe 53C is so disposed that one end of it is in contact with the heat sink 53b. Fins 53D are disposed at the other end of the curved heat pipe 53C, and a fan 53E is disposed so as to deliver cooling air in parallel with the fins 53D. The fan 53E produces a flow of cooling air toward the air outlet opening 52.

As shown in FIGS. 1 and 9, a receiving means 54 for radio communication is disposed at the middle part of the first long side portion 20. The receiving means 54 for radio communication is provided at a position with a short distance from the tip of the penholder 26 accommodating the pen 24 toward the first short side portion 22 and with a some distance from the first short side portion 22. The receiving means 54 for radio communication is designed to receive a radio signal transmitted from a keyboard or a mouse. In this embodiment, the keyboard and the mouse transmit an infrared light signal, and the receiving means 54 includes an infrared light receiving element 54a.

Figure 10:
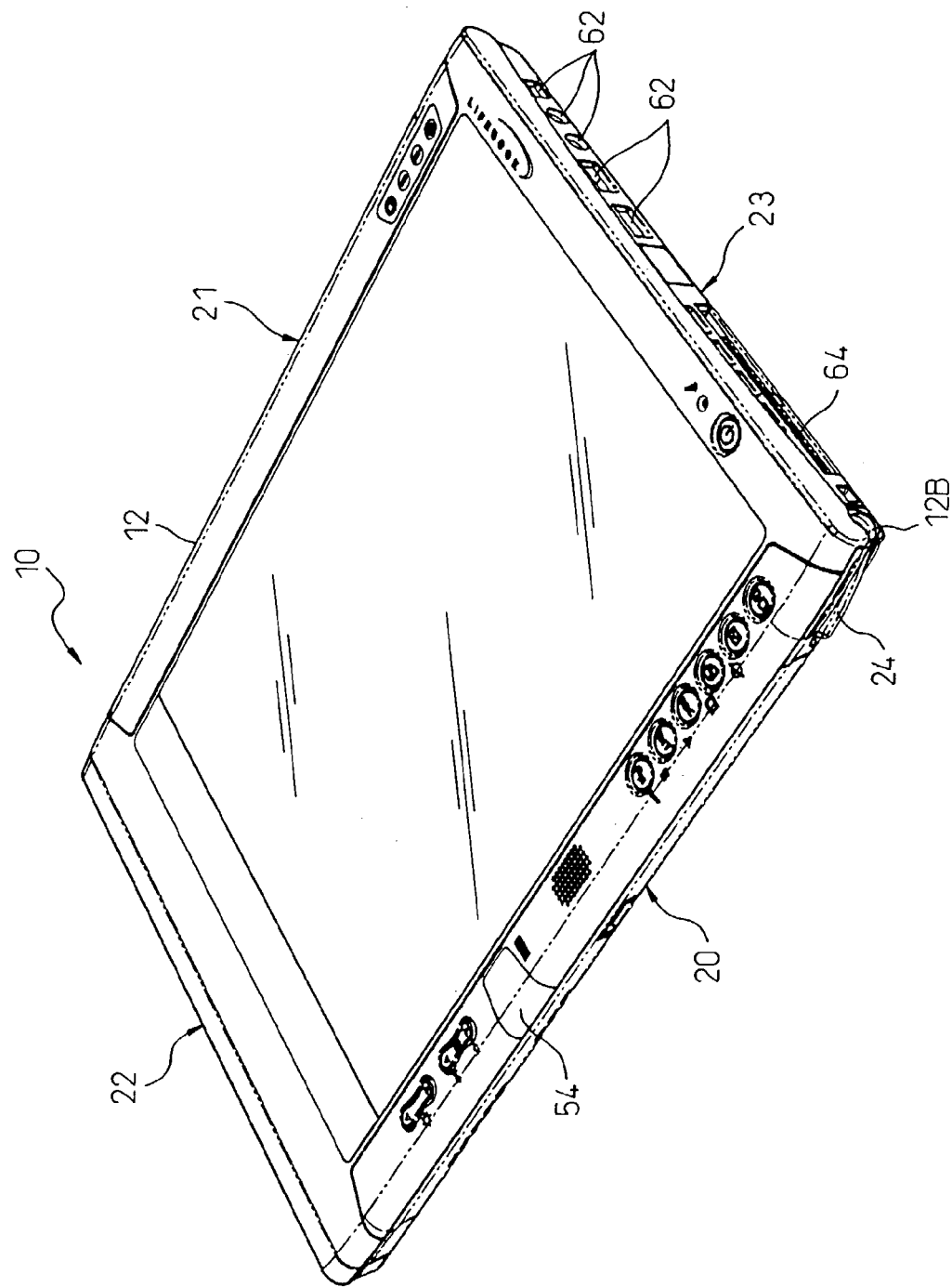
FIG. 10 is a perspective view of the tablet PC, seen from the corner portion between the first long side portion and the second short side portion of FIG. 1.

FIG. 10 is a perspective view of the tablet PC, seen from the corner portion 12B between the first long side portion 20 and the second short side portion 23 of FIG. 1. The pen 24 is disposed at the first long side portion 20.

Figure 11:
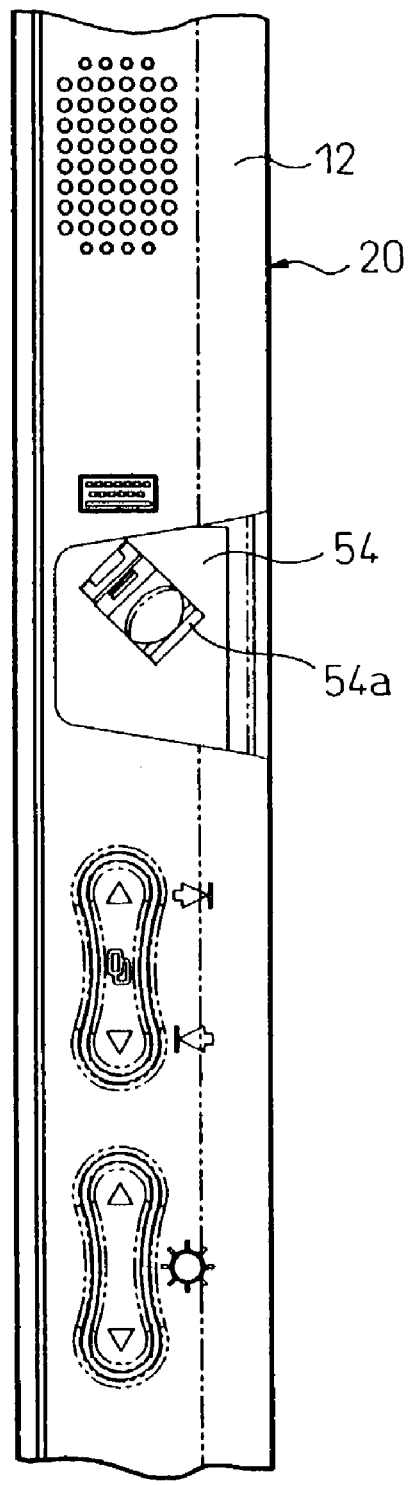
FIG. 11 is a partially enlarged plan view showing the first long side portion of the body having an infrared light receiving element.
Figure 12:
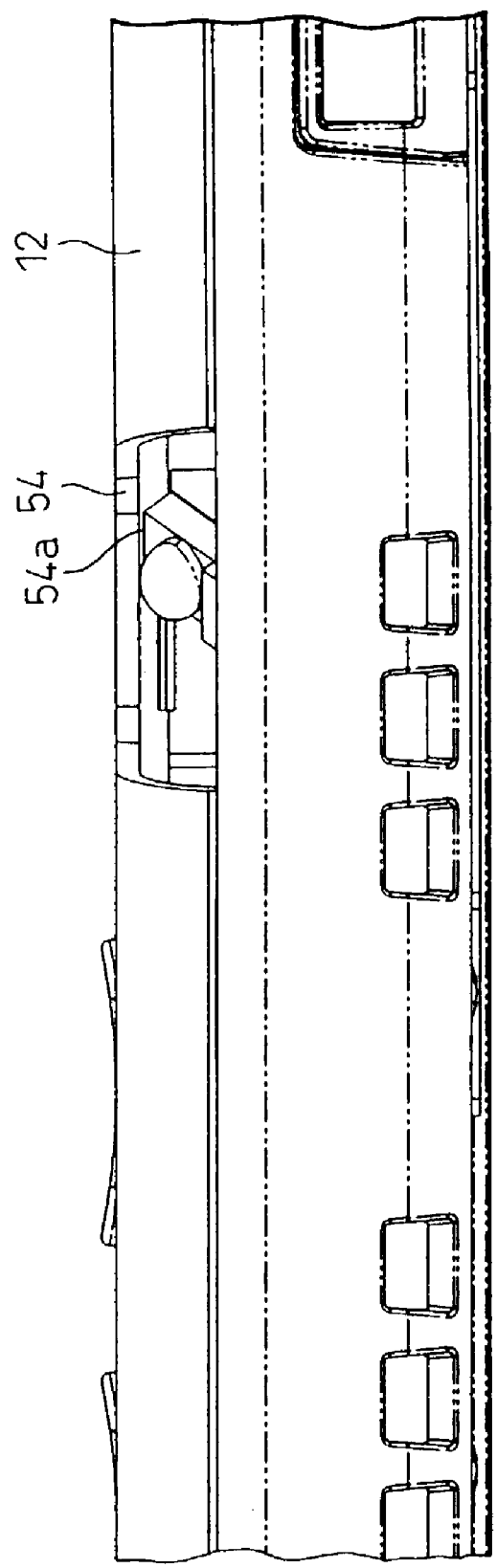
FIG. 12 is a partially enlarged side view showing the first long side portion of the body having an infrared light receiving element.

FIG. 11 is a partially enlarged plan view showing the first long side portion 20 of the body 12 having the infrared light receiving element 54a, and FIG. 12 is a partially enlarged side view showing the first long side portion 20 of the body 12 having the infrared light receiving element 54a. The infrared light receiving element 54a is disposed at a downward inclination of 45 degrees with respect to the first long side portion 20 of the body 12. In FIGS. 1 and 10, a light permeable cover covering the infrared light receiving element 54a is disposed, but in FIGS. 11 and 12, the light permeable cover is removed.

Figure 13:
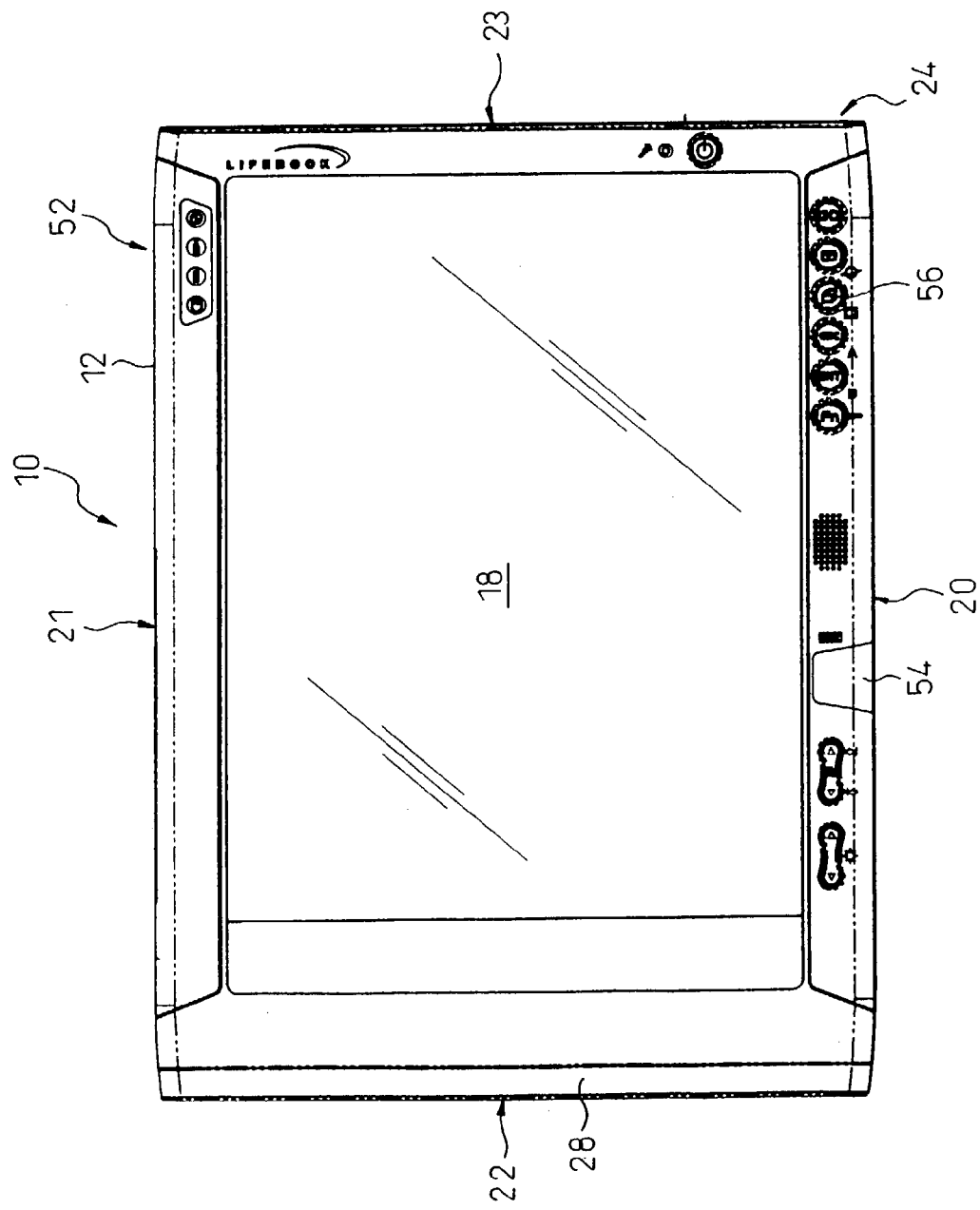
FIG. 13 is a plan view of the tablet PC used in the widthwise position.

FIG. 13 is a plan view of the tablet PC 10 used in the horizontal position. When the tablet PC 10 is used in the horizontal position as shown in FIG. 13, the first long side portion 20 at which the pen 24 is disposed is positioned at the bottom of the tablet PC 10, and the second long side portion 21 is positioned at the top of the tablet PC 10. In this case, the screen of the display portion 18 is horizontally long. A data input operation can be performed with the pen 24 while holding the first long side portion 20 with a hand. The pen 24 can be taken out easily from the penholder 26 with the right hand. Furthermore, as the air outlet opening 52 is disposed at the second long side portion 21 positioned at the top of the tablet PC 10, heated air flows upward and then flows out of the air outlet opening 52.

Figure 14:
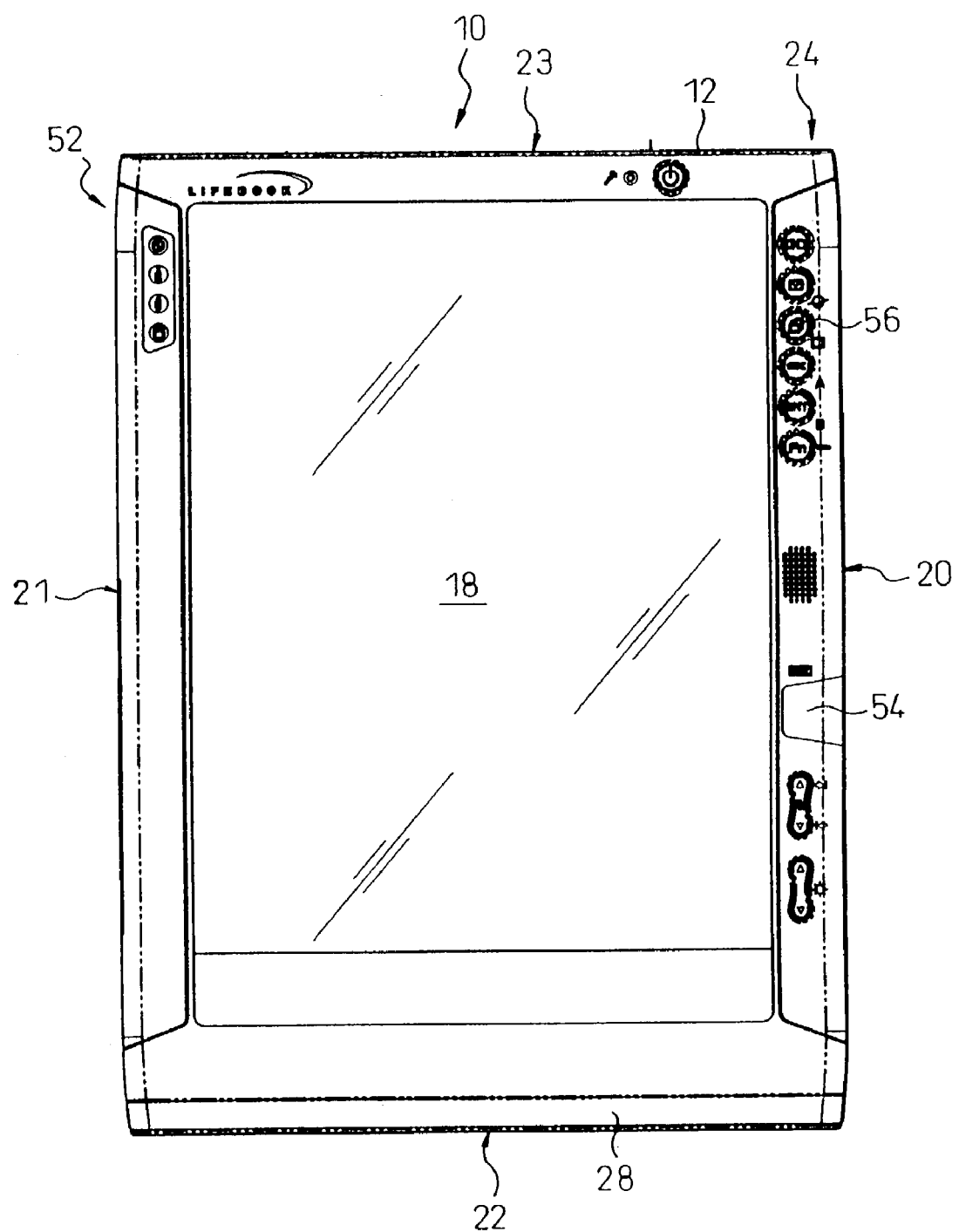
FIG. 14 is a plan view of the tablet PC used in the vertical position.

FIG. 14 is a plan view of the tablet PC 10 used in the vertical position. When the tablet PC 10 is used in the vertical position as shown in FIG. 14, the first short side portion 22 at which the battery 28 is disposed is positioned at the bottom of the tablet PC 10, and the second short side portion 23 is positioned at the top of the tablet PC 10. In this case, the screen of the display portion 18 is vertically long. A data input operation can be performed with the pen 24 while holding the first short side portion 22 with a hand. The pen 24 can also be taken out easily from the penholder 26 with the right hand. Furthermore, as the air outlet opening 52 is disposed near the upper end of the second long side portion 21, heated air flows upward and then flows out of the air outlet opening 52.

As shown in FIGS. 13 and 14, a plurality of operation buttons are arranged on the surface of the body 12. When one of the operation buttons 56 is pushed, a display in the display portion 18 changes between a display suitable for using the tablet PC 10 in the horizontal position and a display suitable for using the tablet PC 10 in the vertical position. Software capable of changing a display in this manner is distributed in the market by, for example, Microsoft Corporation.

The tablet PC 10 further comprises a plurality of I/O connectors. As shown in FIG. 3, many I/O connectors 58 are disposed at the second long side portion 21. For example, a radio communication LAN antenna 58a, a MODEM connector 58b, a LAN connector 58c, a VGA connector 58d, and an AC adapter 58e are disposed at the second long side portion 21. In addition, a keyhole for security 60 is disposed at the second long side portion 21.

Also, as shown in FIGS. 9 and 10, a plurality of I/O connectors 62 are disposed at the second short side portion 23. For example, these I/O connectors 62 include an IEEE 1394 connector, a headphone connector, a microphone connector, an infrared light port, an USB connector, etc. A PC card slot is also disposed at the second short side portion 23. In this way, the battery 28 and the penholder 26 are disposed at two sides portions (the first short side portion 22 and the first long side portion 20) respectively in the four side portions 20, 21, 22, and 23 of the body 12 so that one of the side portions can be held with a hand, and the connectors 58 and the connectors 62 are disposed at two side portions (the second long side portion 21 and the second short side portion 23) respectively so that force is not applied to the connectors 58 and the connectors 62 by a hand.

Figure 15:
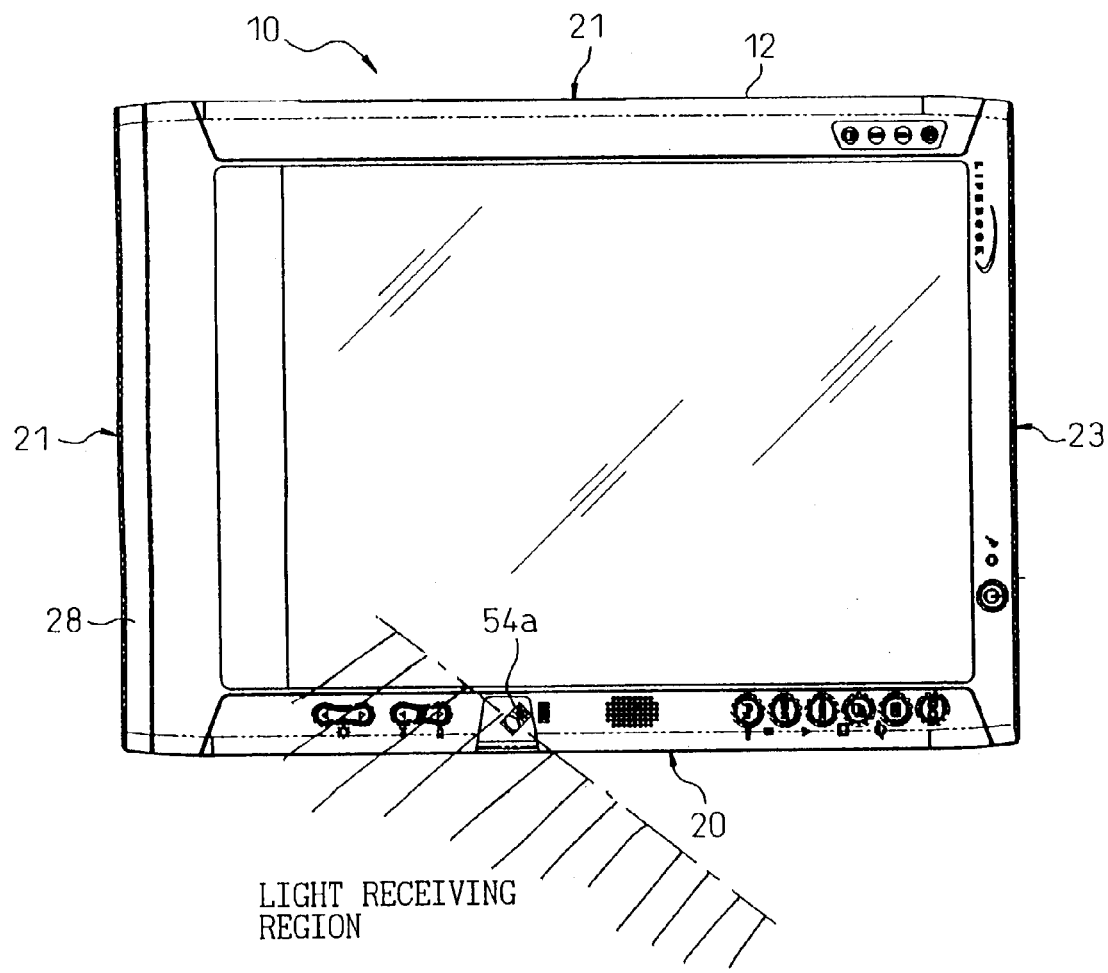
FIG. 15 is a plan view of the tablet PC in the horizontal position like that in FIG. 13, for illustrating the function of the infrared ray receiving element.
Figure 16:
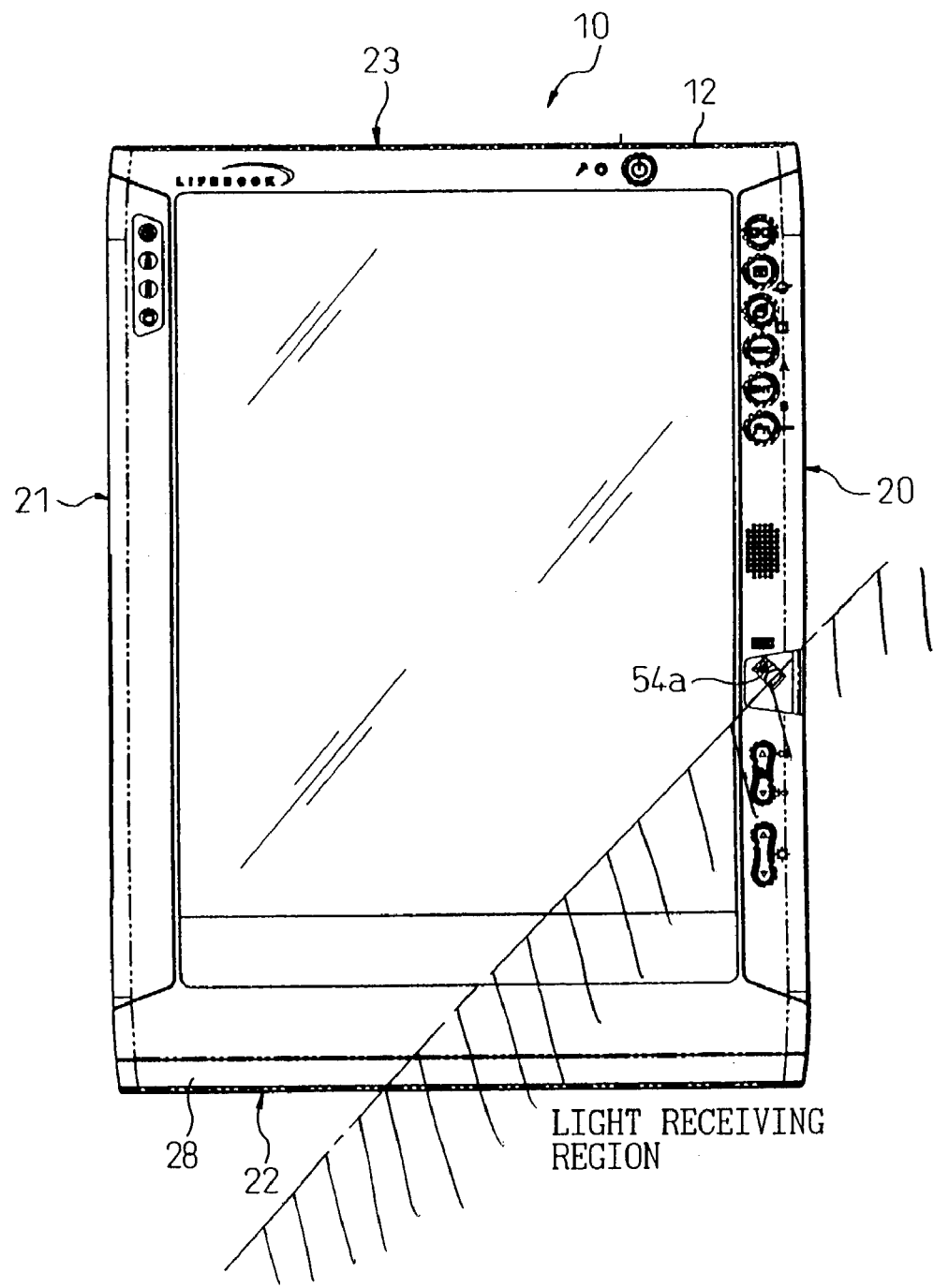
FIG. 16 is a plan view of the tablet PC in the vertical position like that in FIG. 14, for illustrating the function of the infrared ray receiving element.

FIG. 15 is a plan view of the tablet PC in the horizontal position like that in FIG. 13, for illustrating the function of the infrared light receiving element 54a. FIG. 16 is a plan view of the tablet PC in the vertical position like that in FIG. 14, for illustrating the function of the infrared light-receiving element 54a. The infrared light receiving element 54a which is available in the market can detect infrared light made incident from the front of a plane passing through the lens of the infrared light receiving element 54a and normal to the axis of the infrared light receiving element 54a, but cannot detect infrared light made incident from the back of that plane.

When the tablet PC is used in the horizontal position as shown in FIG. 15, the infrared light receiving element 54a can receive an infrared light signal transmitted from the hatched area in FIG. 15. When the tablet PC is used in the vertical position as shown in FIG. 16, the infrared light receiving element 54a can receive an infrared light signal transmitted from the hatched area in FIG. 16. In this way, as the infrared light receiving element 54a is disposed near the midpoint of the first long side portion 20 with an inclination at an angle to it, the single infrared light receiving element 54a can receive an infrared light signal from a wide area, and functions effectively in case that the tablet PC 10 is used in the horizontal position as well as in the vertical position.

Figure 17:
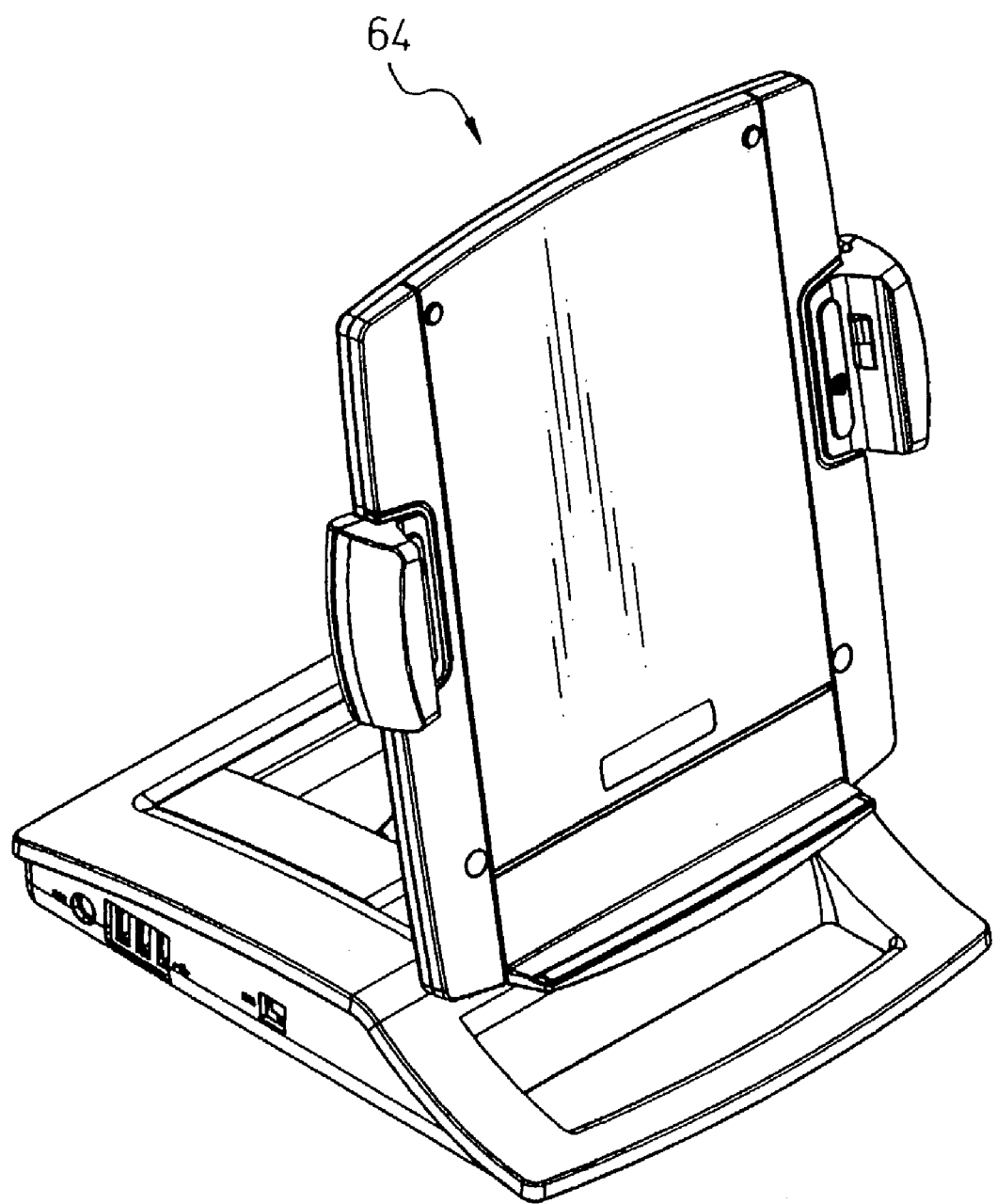
FIG. 17 is a perspective view of the docking unit capable of supporting the tablet PC.
Figure 18:
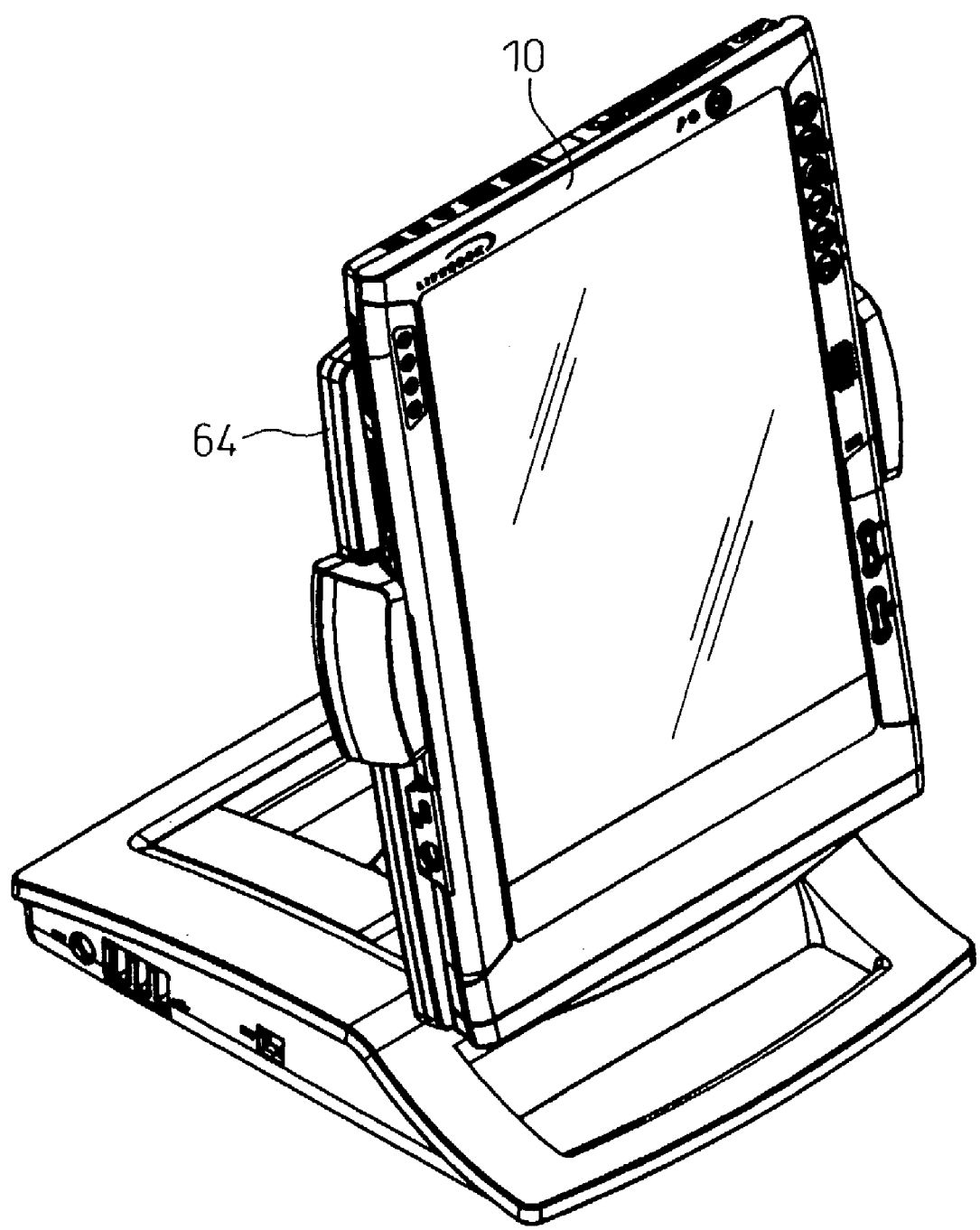
FIG. 18 is a perspective view of the docking unit supporting the tablet PC in the vertical position.
Figure 19:
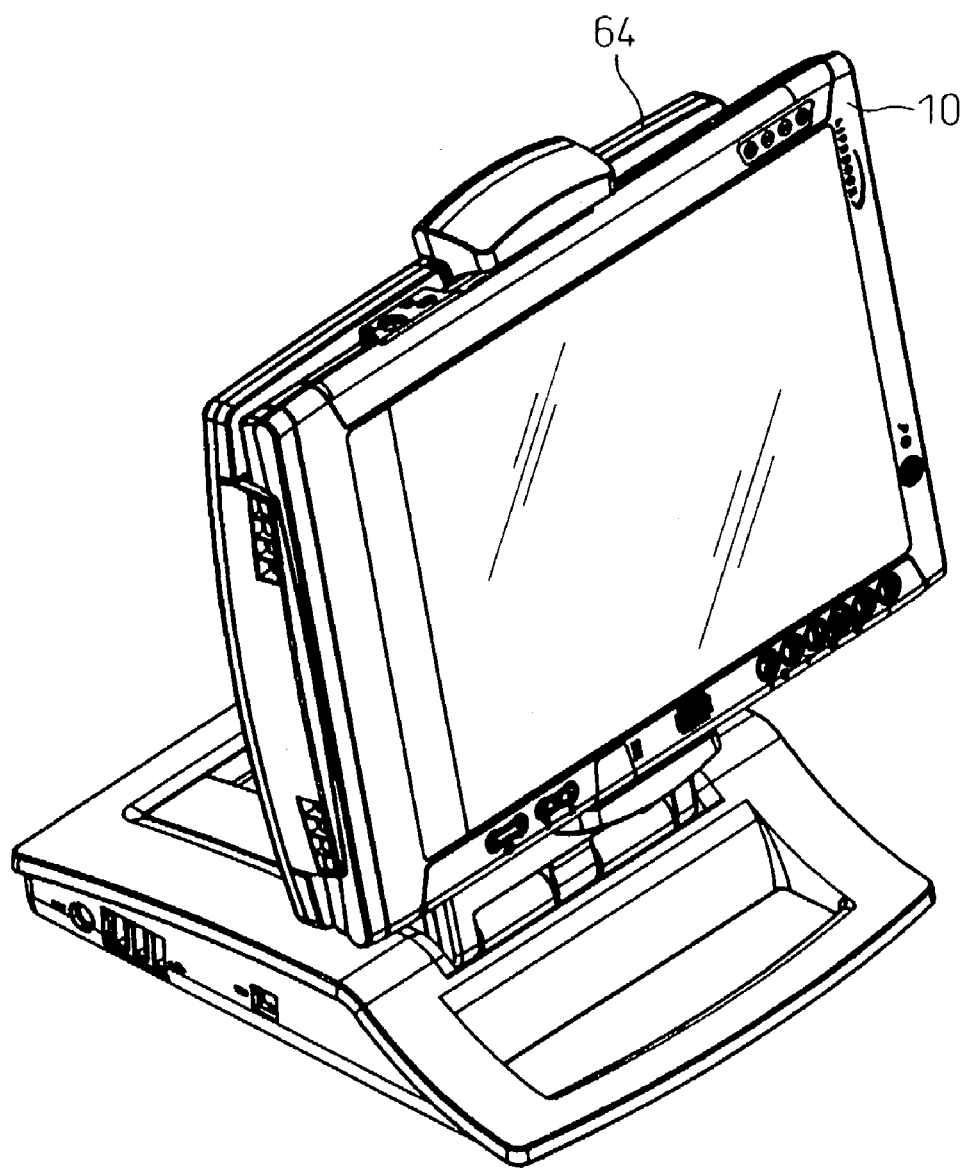
FIG. 19 is a perspective view of the docking unit supporting the tablet PC in the horizontal position.

FIG. 17 is a perspective view of a docking unit 64 capable of supporting the tablet PC 10. FIG. 18 is a perspective view of the docking unit 64 supporting the tablet PC 10 in the vertical position. FIG. 19 is a perspective view of the docking unit 64 supporting the tablet PC 10 in the horizontal position. The tablet PC 10 can be used not only while it is held with a hand but also in the state that it is attached to the docking unit 64 as shown in FIGS. 18 and 19. The tablet PC can be turned on the docking unit 64 to be set in the horizontal position or the vertical position. The docking unit 64 not only supports the tablet PC 10 but also has means to extend the function of the tablet PC 10.

As described above, the present invention provides an information processing apparatus which can be used in any of a horizontal position and a vertical position, can be made into a lightweight one, and has an air outlet opening and/or a receiving means for radio communication.

The invention claimed is:
1. An information processing apparatus comprising:
a rectangular body including a lower cover and an upper cover covering said lower cover;
a battery disposed at a side portion of said body so as to at least partly overlap with said upper cover;

a penholder disposed at a side portion of said body adjacent to the side portion at which said battery is disposed;

an air outlet opening disposed at or near a corner portion of said body between a side portion of said body opposed to the side portion at which said battery is disposed and a side portion of said body opposed to the side portion at which said penholder is disposed; and a receiving device of radio communication disposed at the side portion at which said penholder is disposed;

wherein said body has a pair of long side portions and a pair of short side portions, and said battery is disposed at one of said short side portions.

2. The information processing apparatus according to claim 1, wherein said receiving device is arranged at a position with a short distance from the inner end of the penholder toward the side portion at which said battery is disposed.

* * * * *